SUPER-REGENERATIVE RADIO RECEIVER

Filed Nov. 22, 1961 2 Sheets-Sheet 1

INVENTOR.
JAMES A. BLAKE
BY Hood, Gust & Irish
ATTORNEYS

SUPER-REGENERATIVE RADIO RECEIVER

Filed Nov. 22, 1961 2 Sheets-Sheet 2

INVENTOR.
JAMES A. BLAKE
BY Hood, Gust & Irish
ATTORNEYS

United States Patent Office 3,119,065
Patented Jan. 21, 1964

3,119,065

SUPER-REGENERATIVE RADIO RECEIVER

James A. Blake, Princeton Junction, N.J., assignor, by mesne assignments, to Hood, Gust & Irish, Fort Wayne, Ind., a partnership Filed Nov. 22, 1961, Ser. No. 154,295
11 Claims. (Cl. 325—428)

This invention relates generally to radio receiver apparatus, and more particularly to detector circuits of the super-regenerative type.

Conventional super-regenerative detector circuits, as shown for example in Patent No. 2,922,032 to R. W. Haas et al., comprise an amplifying device, such as a transistor, with a resonant circuit coupled thereto and with means providing feedback thereby to provide an oscillator circuit. A quenching circuit commonly comprising a capacitor and a leak resistor is also coupled to the amplifying device and serves periodically to terminate the oscillations thereby to provide successive bursts of oscillations. When an amplitude modulated signal is coupled to the amplifying device, the repetition frequency of the bursts is varied responsive to the amplitude of the input signal, the bursts occurring more closely together as the signal strength is increased. The rectified current flowing in the amplifying device is in the form of unidirectional pulses responsive to the oscillation bursts and respectively decaying at a uniform exponential rate. When a change in input signal strength occurs, the average rectified current in the amplifying device also changes, providing an audio signal which is conventionally sensed by an audio output transformer.

In prior super-regenerative detector circuits typified by the aforementioned Haas et al. patent when the receiver is near the transmitter and high input signal amplitude is thus provided, by virtue of the uniform exponential decay of the pulses of rectified current in the amplifying device, the rectified pulses in essence are joined to form longer duration pulses each having small peaks along its top responsive to the closely spaced bursts of oscillations. Thus, the rectified pulses tend to integrate in the presence of a strong input signal resulting in a nearly steady-state direct current signal in the output transformer; the detector is thus blanked when the receiver is in close proximity to the transmitter. It is therefore desirable to provide a radio receiver circuit incorporating the desirable features of the super-regenerative detector, i.e., high gain and sensitivity, but which does not lose its sensitivity in the presence of high input signal strength thus permitting its operation in close proximity to the transmitter.

It is accordingly an object of my invention to provide improved radio receiver apparatus.

Another object of my invention is to provide an improved super-regenerative detector circuit.

A further object of my invention is to provide an improved super-regenerative detector circuit which does not lose its sensitivity in the presence of high input signal strength.

Further objects and advantages of my invention will become apparent by reference to the following description and the accompanying drawings, and the features of novelty which characterize my invention will be pointed out with particularity in the claims annexed to and forming a part of this specification.

My invention in its broader aspects provides detector means for providing first unidirectional pulses having a repetition frequency responsive to the amplitude of the input signal and respectively decaying at a uniform exponential rate. Demodulator means is provided for sensing and amplifying the peaks of the first pulses to provide second discrete unidirectional pulses and means are provided for integrating the second pulses.

Figure 1:
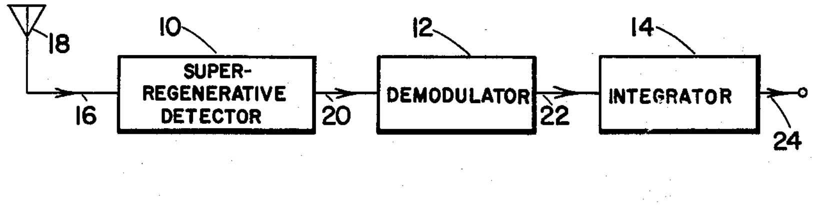
FIG. 1 is a block diagram of my improved radio receiver apparatus.
Figure 3:
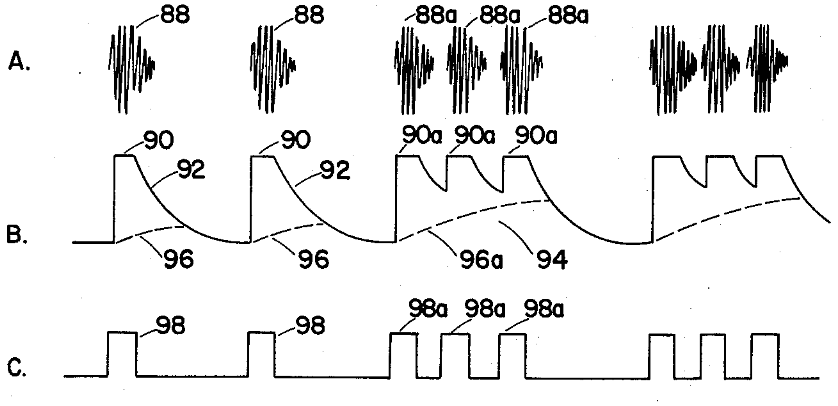
FIG. 3 shows waveforms found in the circuit of FIG. 2 and is useful in explaining the mode of operation of my invention.

Referring now briefly to FIG. 1, in accordance with my invention there is provided a super-regenerative detector 10, a demodulator 12 and an integrating circuit 14. Detector 10 has its input circuit 16 coupled to antenna 18 for receiving an amplitude modulated signal and provides in its output circuit 20 unidirectional pulses having a repetition frequency responsive to the amplitude of the input signal and each decaying at a uniform exponential rate; the output pulses 90 from the detector 10 are shown in FIG. 3B. Demodulator 12 senses and amplifies the peaks of the pulses in the output circuit 20 of detector 10 to provide in its output circuit 22 discrete unidirectional pulses 93 respectively responsive to the pulses in the output circuit of the detector 10, as shown in FIG. 3C. Integrating circuit 14 integrates the discrete unidirectional pulses in the output circuit 22 of demodulator 12 to provide in its output circuit 24 a direct current signal having a level responsive to the repetition frequency of the pulses, i.e., an audio signal.

Figure 2:
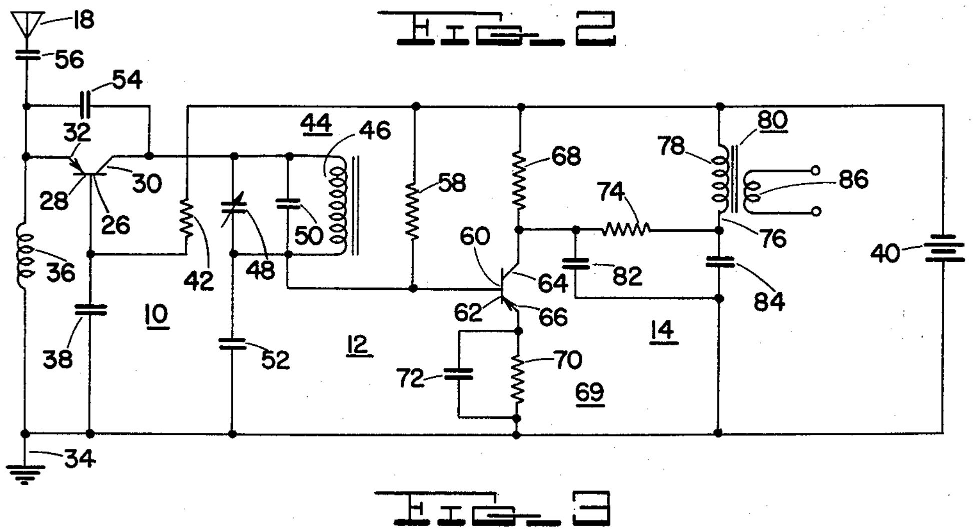
FIG. 2 is a schematic diagram of one embodiment of my invention.

Referring now specifically to FIG. 2, super-regenerative detector 10 comprises a transistor 26 having a base 28, collector 30 and emitter 32. Emitter 32 is connected to the ground 34 through R.F. choke 36 and base 28 is also connected to ground through quenching capacitor 38. Base 28 is also connected to the negative terminal of battery 40 by a leak resistor 42, the positive terminal of the battery being connected to ground 34 as shown. A resonant tank circuit 44 is provided comprising an inductance 46 and two capacitors 48 and 50. One side of the tank circuit 44 is connected to the collector 30 of transistor 26 and the opposite side is connected to ground through capacitor 52. A feedback capacitor 54 is connected across collector 30 and emitter 32, and antenna 18 is connected to emitter 32 by coupling capacitor 56. Supply voltage from battery 40 is connected to the detector circuit 10 through a load resistor 58, connected to the lower side of tank circuit 44, as shown.

The demodulating circuit 12 comprises another transistor 60 having a base 62, collector 64 and emitter 66. Base 62 of transistor 60 is connected to the lower end of the load resistor 58 and to the tank circuit 44, as shown. Collector 64 is connected to the negative terminal of battery 40 by another load resistor 68 and emitter 66 is connected to ground by a time constant circuit 69 comprising resistor 70 and shunt capacitor 72.

The integrating circuit 14 comprises a resistor 74 connected between collector 64 of transistor 60 and end 76 of primary winding 78 of output transformer 80, the other end of the primary winding 78 being connected to the negative side of battery 40, as shown. Capacitors 82 and 84 respectively connect the opposite ends of resistor 74 to ground, as shown. The secondary winding 86 forms the output for the circuit. Capacitor 84 and primary winding 78 of output transformer 80 constitute an audio bypass which is tuned broadly in the audio spectrum. The integrating circuit 14 also includes the resistor 68 and the impedance of transistor 60 looking backwardly into the collector 64. The time constant of integrating circuit 14 should be long compared to the pulses 98 shown in FIG. 3 which are integrated thereby, but short compared to the audio frequency output.

While transistors 26 and 60 have been shown as being of the P-N-P type, it will be readily understood that N-P-N transistors may be employed by reversing the polarity of battery 40.

Transistor 26 is an amplifying device and thus the provision of tank circuit 44 and feedback capacitor 54 provide an oscillatory circuit, the frequency of oscillation being determined by the constants of the inductance 46 and the capacitors 48, 50. While I have shown a feedback capacitor 54, the collector-emitter capacitance of transistor 26 may be sufficient to provide the requisite energy feedback to sustain oscillation. An input signal may be introduced into the circuit either directly by radiation to inductance 46, which preferably is provided with a ferrite core, or by antenna 18 through a suitable coupling arrangement through capacitor 56 as shown. Tuning of the circuit is accomplished, if desired, in the well-known manner either by varying the inductance of inductance 46 or the capacitance of capacitor 48, as shown. Control of the quench frequency of the super-regenerative detector circuit 10 is accomplished by selection of the values of capacitor 38 and leak resistor 42.

In the absence of an input signal received by antenna 18, the detector circuit 10 oscillates at the frequency established by the resonant frequency of the tank circuit 44 and a certain amount of the oscillatory voltage in the tank circuit is fed back to the emitter 32 of transistor 26 by the feedback capacitor 54. As the circuit oscillates, quench capacitor 38 is charged by the rectified current flowing in the emitter-base junction to ground. Charging of capacitor 38 back-biases base 28 so that when the charge has obtained a sufficiently high value, the transistor 26 is turned off and oscillation is terminated. The condenser then discharges through leak resistor 42, thus reducing the bias on the base 28 to a point at which the circuit again begins to oscillate. Thus, the quench frequency of the circuit is normally determined by the time required for the capacitor 38 to become charged and for the charge to be dissipated through leak resistor 42. Under these conditions, bursts 88 of oscillations are provided in the tank circuit 44, the repetition frequency of these bursts being entirely determined by the constants of quench capacitor 38 and leak resistor 42. The rectified current flowing in collector 30 of transistor 26 and in load resistor 58 responsive to bursts 88 thus appears as shown at 90 in FIG. 3B; it will be seen that the unidirectional pulses 90 decay at a uniform exponential rate, as at 92, the decay rate 92 being determined by the discharge rate of capacitor 38 through leak resistor 42, i.e., the time constant provided by capacitor 38 and resistor 42.

When an amplitude modulated signal is received by antenna 18, the repetition frequency of the bursts of oscillations in tank circuit 44 is responsive to the amplitude of the input signal. Thus, as the input signal level increases, the bursts occur sooner and more often, i.e., more closely spaced together as shown at 88*a* in FIG. 3A. Voltage pulses 90*a* are thus developed across load resistor 58 responsive to the oscillation bursts 88*a*, however, since the decay rate 92 of the pulses 90 is still uniform and determined by the constants of quench capacitor 38 and leak resistor 42, pulses 90*a* will not decay to zero before initiation of the next successive pulse, thus, in essence providing an elongated pulse 94 having pulses 90*a* superimposed at its top.

It will be seen that when the amplitude of an input signal varies, the repetition frequency of the oscillation bursts 88 and thus of the pulses 90 varies and therefore the average current flowing in the collector 30 of transistor 26 and thus through resistor 58 changes, this variation in average current thus being responsive to the modulation envelope of the incoming signal and in prior super-regenerative detector circuits being sensed by an output transformer having its primary winding connected in series with load resistor 58. It will be readily seen, however, that in the presence of a very strong input signal, as is the case when the receiver apparatus is in close proximity to the transmitter, oscillation bursts 88*a* will be very closely spaced together thus providing a greatly elongated pulse 94 with very small peaks 90*a* at its top. With these conditions, the average current flowing in load resistor 58 is substantially steady-state and any variation therein is insufficient to be sensed by the output transformer.

In accordance with my invention, the unidirectional pulses 90 which appear across load resistor 58 in the output of the super-regenerative detector 10 are coupled to the base 62 of transistor 60 of the demodulator 14. Increase in the base potential of transistor 60 causes current to flow in the collector-emitter circuit, i.e., through load resistor 68 and time constant resistor 70. The flow of current in resistor 70 develops a voltage across capacitor 72 which causes the capacitor to be charged. This charge on capacitor 72 develops a dynamic bias on the emitter 66 as shown by the dashed lines 96 in FIG. 3B. The capacitor 72 by developing a back-bias on emitter 66 of transistor 60 sets the operating level for transistor 60. It will be seen that an increase in the average current flow through load resistor 58 of super-regenerative detector 10 is accompanied by an increase in the average current flow through resistor 70 and in turn an increase in the charge developed across capacitor 72, thus in turn increasing the back-bias on emitter 66 of transistor 60. Thus, in the case of a high input signal level producing the elongated pulses 94, the dynamic bias on emitter 66 is increased exponentially as shown by the dashed line 96*a*, the net effect being that only the peaks 90*a* are amplified by the transistor 60 and appear across resistor 68. Thus, the current flowing in the collector 54 of transistor 60 and through load resistor 68 is in the form of discrete pulses 98 as shown in FIG. 3C.

The discrete pulses 98 developed across load resistor 58 of the demodulator circuit 12 which are responsive to the pulses 90 developed across load resistor 68 of super-regenerative circuit 10 are impressed upon the integrating circuit 14 in which they are averaged or integrated to provide an audio frequency signal across the primary winding 78 of output transformer 80.

In a specific embodiment of the circuit shown in FIG. 2, the following component values were employed:

| | |
|---|---|
| Transistor 26 | No. 2SA213. |
| Choke 36 | 100 microhenries. |
| Capacitor 38 | .001 microfarads. |
| Resistor 42 | 220,000 ohms. |
| Capacitor 48 | 6 to 30 micromicrofarads. |
| Capacitor 50 | 33 micromicrofarads. |
| Capacitor 54 | 10 micromicrofarads. |
| Resistor 58 | 27,000 ohms. |
| Transistor 60 | 2SB171B. |
| Resistor 68 | 4,700 ohms. |
| Resistor 70 | 22,000 ohms. |
| Capacitor 72 | 30 microfarads. |
| Resistor 74 | 1,000 ohms. |
| Capacitor 82 | .05 microfarads. |
| Capacitor 84 | .05 microfarads. |
| Transformer 80 | 2 to 1 turns ratio. |
| Battery 40 | 9 volts. |

Figure 4:
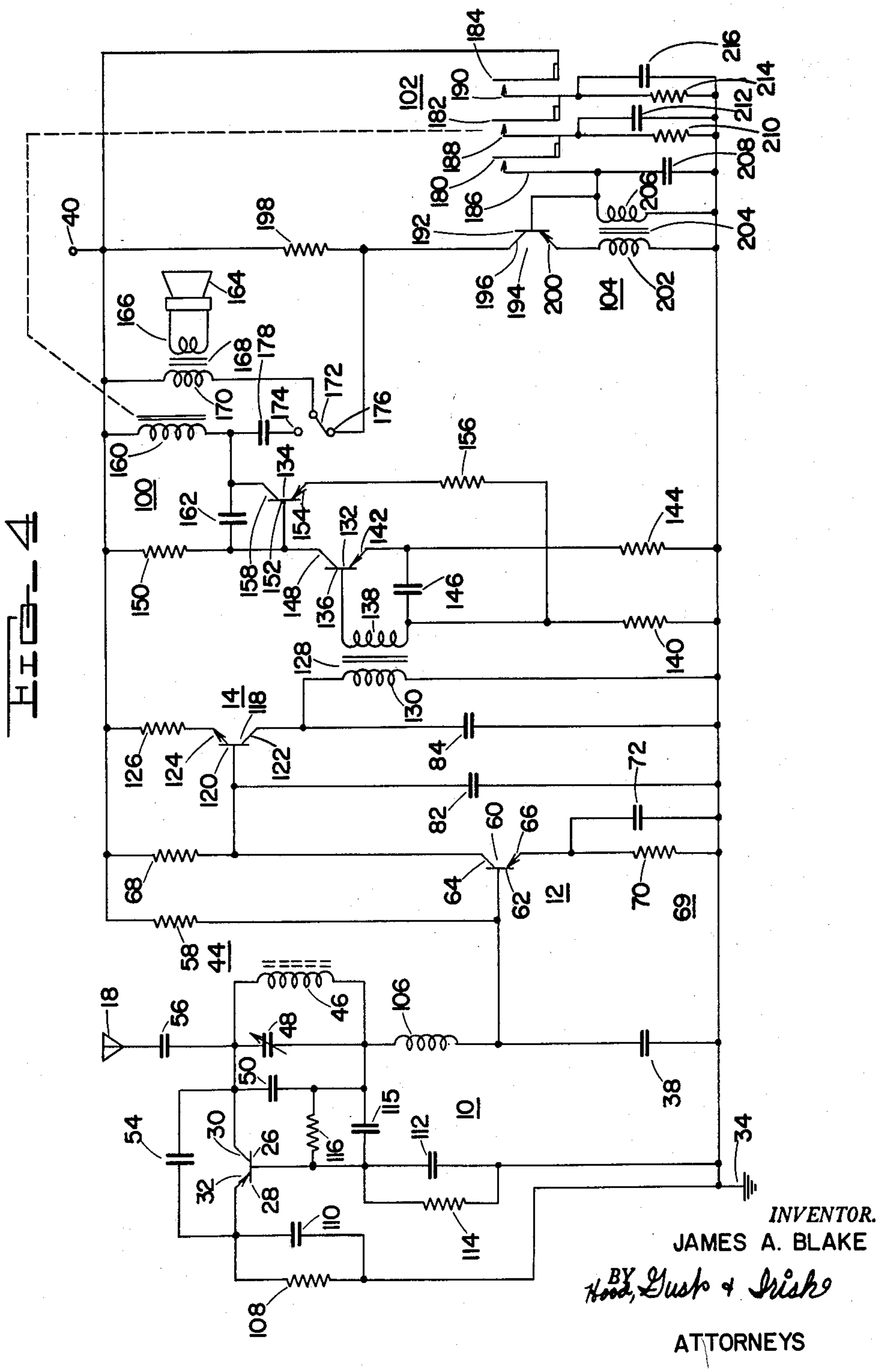
FIG. 4 is a schematic diagram of the preferred embodiment of my invention incorporated in a signalling circuit.

Referring now to FIG. 4, in which like elements are indicated by like reference numerals, there is shown the preferred embodiment of my invention incorporated in a receiver for a radio-calling system of the type in which a pulse-coded radio signal is first transmitted which actuates only the intended receiver to produce an audible tone, following which a voice message is transmitted for reception by the receiver. The circuit shown in FIG. 4 incorporates certain features of my copending application Serial No. 90,721, filed February 21, 1961.

The circuit shown in FIG. 4 again incorporates a super-regenerative detector 10, a demodulator 12 and an integrating circuit 14. The circuit further includes an audio amplifier stage 100, a pulse decoding stage 102 and an audio oscillator 104.

Super-regenerative detector circuit 10, which functions in a manner identical to that shown in FIG. 2, comprises transistor 26 having base, collector and emitter elements 28, 30 and 32. Tank circuit 44 comprising inductance 46 and capacitors 48 and 50 has one side connected to collector 30 of transistor 26 and its opposite side connected to ground 34 by R.F. choke 106 and capacitor 38. Antenna 18 in this instance is coupled to collector 30 of transistor 26 by capacitor 56. Capacitor 54 is again connected across the collector 30 and emitter 32. Emitter 32 is connected to ground 34 by resistor 108 having capacitor 110 connected in shunt therewith. Base 28 is connected to ground by capacitor 112 having resistor 114 in shunt therewith. Base 28 is also coupled to the side of tank circuit 44 to which choke 106 is connected by capacitor 115 having resistor 116 in shunt therewith, capacitor 115 and resistor 116 forming the quenching circuit. The end of choke 106 remote from tank circuit 144 is connected to the source 40 of suitable negative direct current potential, such as minus 8.4 volts, by load resistor 58.

Transistor 60 of demodulator circuit 12 has its base 62 connected to the end of resistor 58 remote from source 40 and has its collector 64 connected to source 40 by load resistor 68. Emitter 66 of transistor 60 is connected to ground 34 by time constant circuit 69 comprising resistor 70 and shunt capacitor 72.

Integrating circuit 14 in this embodiment comprises capacitor 82 connected between collector 64 of transistor 60 and ground 34, transistor 118 and capacitor 84. The base 120 of transistor 118 is connected to collector 64 of transistor 60, the collector 122 is connected to ground 34 by capacitor 84, and the emitter 124 is connected to source 40 by resistor 126. It will be seen that transistor 118 functions not only as an amplifier but also that its internal impedance serves as the series resistance in the integrating circuit.

Output transformer 128 is provided having its primary winding 130 connected between collector 122 of transistor 118 and ground 34. Amplifier stage 100 comprises transistors 132 and 134. Transistor 132 has its base 136 connected to one side of secondary winding 138 of output transformer 128, the other side being connected to ground 34 by resistor 140. Emitter 142 of transistor 132 is connected to ground 34 by resistor 144 and to the end of resistor 140 remote from ground by capacitor 146. The collector 148 of transistor 132 is connected to source 40 by resistor 150.

Transistor 134 has its base 152 connected to collector 148 of transistor 132 and its emitter 154 connected in series with resistor 140 by resistor 156. Collector 158 of transistor 134 is connected to source 40 by operating coil 160 of decoder 102 and to collector 148 of transistor 132 by capacitor 162.

A loudspeaker 164 is provided connected to the secondary winding 166 of output transformer 168. Primary winding 170 of transformer 168 has one end connected to source 40 and its other end connected to movable switch contact 172, which is selectively movable between stationary contacts 174 and 176. Stationary contact 174 is connected to collector 158 of transistor 134 by capacitor 178.

Decoder 102 comprises a plurality, shown here as being three (3), magnetic vibratory reeds 180, 182 and 184 respectively associated with contacts 186, 188 and 190. Reeds 180, 182 and 184 are associated with coil 160 and vibrate responsive to energization of the coil 160. Reeds 180, 182 and 184 are pretuned so that they all vibrate in unison with maximum amplitude when a predetermined pulse-code is received and the resulting pulsed audio signal impressed upon vibrator coil 160. It will be readily comprehended that when all of the reeds are vibrating in unison and with maximum amplitude, contacts 186, 188 and 190 will be simultaneously closed for an average of one-half a given elapsed time interval.

Reed 184 is connected to source 40 and contact 186 is connected to base 192 of transistor 194 of the audio oscillator 104. Collector 196 of transistor 194 is connected to source 40 by resistor 198 and also to stationary contact 176 of switch 172. Emitter 200 of transistor 194 is connected to ground 34 by secondary winding 202 of transformer 204. Base 192 of transistor 194 is also connected to ground 34 by primary winding 206 of transformer 204 which has capacitor 208 in shunt therewith. It will readily be comprehended that primary winding 206 and capacitor 208 form a resonant tank circuit for the audio oscillator 104 with secondary winding 202 of transformer 204 forming the regenerative feedback connection. Reed 180 and contact 188 are connected to ground 34 by resistor 210 having capacitor 212 in shunt therewith and reed 182 and contact 190 are likewise connected to ground by resistor 214 having capacitor 260 in shunt therewith.

It will be readily seen that when switch 172 is moved to contact 176, primary winding 170 of output transformer 168 which energizes loudspeaker 164 is connected to collector 196 of transistor 194 of the audio oscillator 104 and will thus produce an audible tone in response to the output signal generated by the oscillator 104. Oscillator 104 is in turn triggered into operation responsive to vibration of the reeds 184, 182 and 180 in sequence, i.e., reed 184, then reed 182 and finally reed 180 triggers the oscillator by coupling base 192 to the source 40 of negative potential. The networks 210, 212, 214 and 216 serve as memories and allow transfer of the signal through the reeds in sequence.

The user of the receiver normally leaves switch 172 in the position to engage stationary contact 176 and thus when each individual's pulse code is received by antenna 18, the speaker 164 will produce an audible tone whereupon the user will move the switch 172 to the position engaging stationary contact 174. It will be seen that in this position primary winding 170 of output transformer 168 is connected to collector 158 of transistor 134 of amplifier 100 by coupling capacitor 178 and thus, the detected audio signal at the output of the integrating stage 14, as amplified by the amplifying stage 100, will be reproduced by the loudspeaker 164.

In an actual circuit in accordance with FIG. 4, the following component values were employed:

| | |
|---|---|
| Capacitor 48 | 6 to 30 microfarads. |
| Capacitor 50 | 33 microfarads. |
| Transistor 26 | T1767. |
| Capacitor 38 | .01 microfarads. |
| Capacitor 56 | 5 microfarads. |
| Capacitor 54 | 10 microfarads. |
| Resistor 108 | 470,000 ohms. |
| Capacitor 110 | .01 microfarads. |
| Capacitor 112 | 10 microfarads. |
| Resistor 114 | 4,700 ohms. |
| Capacitor 115 | .001 microfarads. |
| Resistor 116 | 47,000 ohms. |
| Resistor 58 | 18,000 ohms. |
| Transistor 60 | SP146. |
| Resistor 68 | 2,700 ohms. |
| Resistor 70 | 27,000 ohms. |
| Capacitor 72 | 3 microfarads. |
| Capacitor 82 | .05 microfarads. |
| Transistor 118 | 2N214. |
| Capacitor 84 | .05 microfarads. |
| Resistor 126 | 470,000 ohms. |
| Transistor 132 | SP146. |
| Transistor 134 | SP146. |
| Resistor 140 | 390,000 ohms. |

| | |
|---|---|
| Capacitor 146 | 30 microfarads. |
| Resistor 144 | 1,200 ohms. |
| Resistor 150 | 12,000 ohms. |
| Resistor 156 | 470,000 ohms. |
| Capacitor 162 | .02 microfarads. |
| Capacitor 178 | .1 microfarad. |
| Transistor 194 | SP146. |
| Resistor 198 | 30,000 ohms. |
| Capacitor 208 | .1 microfarad. |
| Resistor 210 | 15 megohms. |
| Capacitor 212 | .05 microfarad. |
| Resistor 214 | 22 megohms. |
| Capacitor 216 | .01 microfarad. |

It will be seen that my improved circuit is insensitive to the average amplitude of the input signal, however, that the demodulator circuit 12 is sensitive to the repetition frequency of the output pulses of the superregenerative detector circuit which in turn are responsive to the amplitude of the input signal and thus the intelligence contained in its modulation. Provision of the demodulator circuit 12 thus permits operation of the receiver apparatus close to a transmitter as well as at a distance therefrom in contrast with conventional circuits in which the sensitivity is reduced to zero in close proximity to the transmitter.

While I have shown and described specific embodiments of my invention, further modifications and improvements will occur to those skilled in the art and I desire therefore in the appended claims to cover all modifications which do not depart from the spirit and scope of my invention.

What is claimed is:

1. In combination: a source of first unidirectional pulses which respectively decay at a uniform exponential rate; demodulator means comprising an amplifying device having control means and rectifying means, said rectifying means including two opposite polarity connecting elements, said control means being coupled to said source for receiving said first pulses, and a time constant circuit coupled to one of said connecting elements for varying the operating level of said device responsive to the average amplitude of said first pulses whereby the peaks of said first pulses are sensed and amplified to provide second discrete unidirectional pulses; and an integrating circuit coupled to the other connecting element of said device for providing a direct current signal having a level responsive to the repetition frequency of said second pulses.

2. In combination: a source of unidirectional pulses which respectively decay at a uniform exponential rate; a source of direct current potential; said pulse source including a load resistor coupled to one side of said direct current source and having said first pulses developed thereacross; demodulator means comprising an amplifying device having control means and rectifying means, said rectifying means including two opposite polarity connecting elements, said load resistor being coupled to said control means for impressing said first pulses thereon, a second resistor coupling one connecting element to said one side of said source, and a time constant circuit comprising a shunt connected capacitor and resistor coupling the other connecting element to the other side of said source for varying the operating level of said device responsive to the average current flow in said load resistor whereby the peaks of said first pulses are sensed and amplified to develop second discrete unidirectional pulses across said second resistor; and an integrating circuit coupled to said one connecting element for providing a direct current signal having a level responsive to the repetition frequency of said second pulses.

3. The combination of claim 2 further comprising an output transformer having primary and secondary windings with the primary winding serially connected with a second capacitor across said source; and wherein said integrating circuit comprises a third resistor connected between said one connecting element and the midpoint between said primary winding and second capacitor, and a third capacitor connected between said one connecting element and the side of said second capacitor remote from said primary winding, said integrating circuit including said second resistor and second capacitor, said second capacitor and primary winding being tuned to pass audio frequencies.

4. The combination of claim 2 wherein said pulse source is a super-regenerative detector circuit including another amplifying device having control means and rectifying means, an input circuit coupled to the last-mentioned control means and the last-mentioned rectifying means, a resonant tank circuit serially connected with said load resistor and the last-mentioned rectifying means, and a quenching circuit comprising a capacitor coupled to said control means and a leak resistor coupling said control means to said one side of said potential source.

5. A circuit for receiving an amplitude modulated input signal and converting the same to an audio output signal comprising: an input circuit for receiving said signal; a super-regenerative detector circuit comprising a first transistor having emitter, collector and base elements, said input circuit being coupled across one of the emitter and collector elements and the base element, a source of direct current potential, a resonant tank circuit and a first load resistor serially coupled between the collector and one side of said source, and a quenching circuit comprising a capacitor coupled to said base and a leak resistor coupled to said capacitor thereby developing across said load resistor first unidirectional pulses having a repetition frequency responsive to the amplitude of said input signal and respectively decaying at a uniform exponential rate; a demodulator circuit comprising a second transistor having emitter, collector and base element, said base being connected to said first load resistor whereby said first pulses are impressed thereon, a second load resistor coupling said collector to said one side of said source, a time constant circuit comprising a shunt-connected resistor and capacitor connected between said emitter and the other side of said source for varying the operating level of said second device responsive to the average current flow in said first load resistor whereby the peaks of said first pulses are sensed and amplified to develop second discrete unidirectional pulses across said second load resistor; and an integrating circuit coupled to said collector of said second transistor for providing a direct current signal having a level responsive to the repetition frequency of said second pulses.

6. The combination of claim 5 further comprising an output transformer having primary and secondary windings with the primary winding having one end connected to said one side of said source and a third capacitor connecting the other side of said primary winding to the other side of said source; and wherein said integrating circuit comprises another resistor connecting said collector of said second transistor and the other end of said primary winding, and another capacitor connected between said collector of said second transistor and the other side of said source, said integrating circuit including said second load resistor and third capacitor, said third capacitor and primary winding being tuned to pass audio frequencies.

7. The combination of claim 2 wherein said integrating circuit comprises a second capacitor connected between said one connecting element and said other side of said source, another amplifying device having control and rectifying means, said control means of said other amplifying device being connected to said one connecting element of said first-named amplifying device, a third resistor coupling said rectifying means of said other amplifying device to said one side of said source, and a third capacitor connected between said rectifying means of said other amplifying device and said other side of said source, the last-mentioned rectifying means being series coupled between said third resistor and said third capacitor, said integrating circuit including said second resistor; and further comprising an output circuit coupled to said rectifying means of said other amplifying device.

8. The combination of claim 7 wherein said output circuit comprises an output transformer having primary and secondary windings with the primary winding coupled in series with said rectifying means of said other amplifying device and said other side of said source, said primary winding and third capacitor being tuned so that said primary winding passes audio frequencies.

9. The combination of claim 5 wherein said integrating circuit comprises a third capacitor connected between said collector of said second transistor and said other side of said source, a third transistor having emitter, collector and base elements, said base element of said third transistor being connected to the collector of said second transistor, another resistor connected between the emitter of said third transistor and said one side of said source, and a fourth capacitor connected between the collector of said third transistor and said other side of said source, said integrating circuit including said second load resistor; and further comprising an output transformer having primary and secondary windings with the primary winding being connected across said fourth capacitor, said primary winding and fourth capacitor being tuned so that said primary winding passes audio frequencies.

10. The combination of claim 2 wherein said integrating circuit has an output circuit; and further comprising an operating coil coupled to said output circuit and energized responsive to the output signal therein, a plurality of magnetic reeds associated with said coil and vibrated thereby responsive to the energization of said coil, said reeds being pretuned whereby said reeds vibrate in sequence responsive to a said output signal of predetermined characteristic; an audio oscillator comprising another amplifying device having control and rectifying means, and a resonant tank circuit coupled to one of said control and rectifying means of said other amplifying device and a regenerative feedback circuit coupling said tank circuit to another of said control and rectifying means of said other amplifying device, said reeds serially connecting one of said last-mentioned control and rectifying means to one side of said source when said reeds are sequentially vibrated thereby energizing said audio oscillator; transducer means, and switching means selectively coupling said transducer means to one of said control and rectifying means of said other amplifying device and to said output circuit whereby said transducer means is selectively energized by the output signal of said audio oscillator and said output signal.

11. The combination of claim 9 further comprising an operating coil coupled to said secondary winding and energized responsive to the output signal therein, a plurality of magnetic reeds associated with said coil and vibrated thereby responsive to energization of said coil, said reeds being pretuned whereby said reeds vibrate in sequence responsive to a said output signal of predetermined characteristic; an audio oscillator comprising a fourth transistor having emitter, collector and base elements, an audio transformer having primary and secondary windings, a fifth capacitor coupled across said audio transformer primary winding and forming a resonant tank circuit therewith, said emitter element of said fourth transistor being coupled to said other side of said source by said audio transformer secondary winding, said collector element of said fourth transistor being connected to said one side of said source by another load resistor, said base element of said fourth transistor being connected to said last-named tank circuit, said reeds serially connecting said base element of said fourth transistor to said one side of said source when said reeds are sequentially vibrated thereby energizing said audio oscillator; a loudspeaker; and a switch selectively coupling said loudspeaker to said collector element of said fourth transistor for energization by the output signal of said audio oscillator, and to said secondary winding of said output transformer for energization by the output signal therein.

References Cited in the file of this patent

UNITED STATES PATENTS

| | | |
|---|---|---|
| 2,535,401 | Emerson | Dec. 26, 1950 |
| 2,899,547 | Crow et al. | Aug. 11, 1959 |
| 3,028,487 | Losee | Apr. 3, 1962 |

OTHER REFERENCES

Cruft Electronics Staff: Electronic Circuits and Tubes, McGraw-Hill, 1947, pages 741–748.